(12) United States Patent
Fujimori et al.

(10) Patent No.: US 9,176,358 B2
(45) Date of Patent: Nov. 3, 2015

(54) ELECTROOPTICAL DEVICE, ELECTRONIC DEVICE, AND CONTROL METHOD FOR ELECTROOPTICAL DEVICE

(71) Applicant: SEIKO EPSON CORPORATION, Tokyo (JP)

(72) Inventors: Keitaro Fujimori, Fujimi-machi (JP); Hideki Ogawa, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 54 days.

(21) Appl. No.: 14/212,037

(22) Filed: Mar. 14, 2014

(65) Prior Publication Data

US 2014/0268302 A1   Sep. 18, 2014

(30) Foreign Application Priority Data

Mar. 18, 2013   (JP) ................. 2013-054684

(51) Int. Cl.
*G02B 26/00* (2006.01)
*G09G 3/34* (2006.01)
(Continued)

(52) U.S. Cl.
CPC ............ *G02F 1/167* (2013.01); *G02F 1/0018* (2013.01); *G02F 1/133348* (2013.01); *G02F 1/133516* (2013.01); *G02F 1/133553* (2013.01);
(Continued)

(58) Field of Classification Search
CPC ............ G02F 1/167; G02F 2001/1678; G02F 1/133348; G02F 1/133553; G02F 1/133516; G02F 1/172; G02F 1/0018; G02F 1/133621; G09G 3/344; G09G 3/2003

USPC .......................... 359/296; 345/107
See application file for complete search history.

(56) References Cited

U.S. PATENT DOCUMENTS 6,636,186 B1   10/2003   Yamaguchi et al.
6,862,016 B2 *  3/2005   Matsuura et al. ............. 345/107
(Continued)

FOREIGN PATENT DOCUMENTS

JP   A-2000-194021   7/2000
JP   A-2001-290178   10/2001
(Continued)

OTHER PUBLICATIONS

Yashiro et al., "Novel Design for Color Electrophoretic Display", *SID 11 Digest*, 2011, pp. 42-45, vol. 5.3.
(Continued)

*Primary Examiner* — Evelyn A Lester
(74) *Attorney, Agent, or Firm* — Oliff PLC

(57) ABSTRACT

Provided is an electrooptical device, an electronic device, a control method for an electrooptical device, and the like that can easily realize various characteristics that are difficult to realize with related art. An electrooptical device uses electrophoretic particles migrating in a dispersion medium for image display. The electrooptical device includes a first electrode, a second electrode, first electrophoretic particles that are pigmented in a first color and charged in a first polarity, and second electrophoretic particles that are pigmented in the first color and charged in the first polarity. The first electrophoretic particles and the second electrophoretic particles are disposed between the first electrode and the second electrode. An absolute value of a charge quantity of the first electrophoretic particles is larger than an absolute value of a charge quantity of the second electrophoretic particles.

15 Claims, 13 Drawing Sheets

(51) Int. Cl.
*G02F 1/167* (2006.01)
*G02F 1/1335* (2006.01)
*G02F 1/00* (2006.01)
*G02F 1/1333* (2006.01)
*G09G 3/20* (2006.01)
*G02F 1/17* (2006.01)

(52) U.S. Cl.
CPC ........... *G02F1/133621* (2013.01); *G02F 1/172* (2013.01); *G02F 2001/1678* (2013.01); *G09G 3/2003* (2013.01); *G09G 3/344* (2013.01)

(56) References Cited

U.S. PATENT DOCUMENTS

| | | | |
|---|---|---|---|
| 8,687,265 B2* | 4/2014 | Ahn et al. | 359/296 |
| 2003/0030884 A1* | 2/2003 | Minami | 359/296 |
| 2006/0202949 A1 | 9/2006 | Danner et al. | |
| 2008/0117165 A1* | 5/2008 | Machida et al. | 345/107 |
| 2010/0284058 A1 | 11/2010 | Kaga et al. | |
| 2011/0133627 A1 | 6/2011 | Yi et al. | |
| 2011/0310461 A1 | 12/2011 | Bouchard et al. | |

FOREIGN PATENT DOCUMENTS

| | | |
|---|---|---|
| JP | A-2007-140129 | 6/2007 |
| JP | A-2009-92773 | 4/2009 |
| JP | A-2011-123468 | 6/2011 |
| JP | A-2011-158783 | 8/2011 |

OTHER PUBLICATIONS

Hiji et al., "Novel Color Electrophoretic E-Paper Using Independently Movable Colored Particles", *SID*, 2012, vol. 8.4.

* cited by examiner

ELECTROOPTICAL DEVICE, ELECTRONIC DEVICE, AND CONTROL METHOD FOR ELECTROOPTICAL DEVICE

CROSS-REFERENCE TO RELATED APPLICATIONS

This application claims priority to Japanese Patent Application No. 2013-054684 filed on Mar. 18, 2013. The entire disclosure of Japanese Patent Application No. 2013-054684 is hereby incorporated herein by reference.

BACKGROUND

1. Technical Field

The present invention relates to an electrooptical device, an electronic device using the same, a control method for an electrooptical device, and the like.

2. Related Art

An electrophoretic display device is known as one example of an electrooptical device. An electrophoretic display device is configured such that electrophoretic elements including pigmented electrophoretic particles are held between a pixel electrode and an counter electrode. The electrophoretic display device displays an image by causing the electrophoretic particles to migrate through application of a voltage between these two electrodes. At this time, in the electrophoretic display device, the color of the displayed image can be changed by, for example, controlling the electrophoretic particles pigmented in different colors to migrate independently on a per-color basis. The electrophoretic elements are composed of, for example, a plurality of microcapsules that are sealed between the pixel electrode and the counter electrode. Every microcapsule includes a plurality of electrophoretic particles.

Technology related to such an electrophoretic display device is disclosed in, for instance, the following examples of related art: JP-A-2000-194021, the specification of US-A1-2011/0310461, the specification of US-A1-2006/0202949, T. Yashiro, "Novel Design for Color Electrophoretic Display", SID 2011 5.3 (hereinafter, simply "Yashiro"), and N. Hiji, "Novel Color Electrophoretic E-Paper Using Independently Movable Colored Particles", SID 2012 8.4 (hereinafter, simply "Hiji").

JP-A-2000-194021 discloses a display device in which a microcapsule includes a dispersion medium pigmented in black, and electrophoretic particles dispersed in the dispersion medium have different electrophoretic mobilities for different colors. This display device displays different tones in accordance with a difference in values of applied voltages or time periods of voltage application.

The specification of US-A1-2011/0310461 discloses an electrophoretic display device that displays a color image using red, green, blue, and white color filters.

The specification of US-A1-2006/0202949 discloses an electrophoretic display device in which a plurality of electrophoretic particles having different electrophoretic mobilities are included in a fluid. This electrophoretic display device displays an image in accordance with optical characteristics of the respective electrophoretic particles.

Yashiro discloses an electrophoretic display device that displays a color image using a configuration in which electrochromic layers are stacked on a per-color basis.

Hiji discloses an electrophoretic display device that displays a color image by independently controlling pigmented electrophoretic particles that have different thresholds.

As can be understood from JP-A-2000-194021, the specification of US-A1-2011/0310461, the specification of US-A1-2006/0202949, Yashiro, and Hiji, the characteristics of electrophoretic particles, as well as the characteristics of a liquid in which the electrophoretic particles are dispersed, are important elements in determining how an electrophoretic display device should be controlled. It is important for an electrophoretic display device to achieve further improvements in function, such as higher contrast, expansion in a temperature range of operation, extension in a time period for which a display state is retained, and reduction in a time period for which a display state is updated.

SUMMARY

An advantage of some aspects of the invention enables provision of an electrooptical device, an electronic device, a control method for an electrooptical device, and the like that can easily realize various characteristics that are difficult to realize with related art.

First Application Example

An electrooptical device according to the present application example uses electrophoretic particles migrating in a dispersion medium for image display, and includes: a first electrode; a second electrode; first electrophoretic particles that are pigmented in a first color and charged in a first polarity; and second electrophoretic particles that are pigmented in the first color and charged in the first polarity. Here, the first electrophoretic particles and the second electrophoretic particles are disposed between the first electrode and the second electrode, and an absolute value of a charge quantity of the first electrophoretic particles is larger than an absolute value of a charge quantity of the second electrophoretic particles.

This configuration includes: the first electrode; the second electrode; the first electrophoretic particles that are pigmented in the first color and charged in the first polarity; and the second electrophoretic particles that are pigmented in the first color and charged in the first polarity. Also, in this configuration, the first electrophoretic particles and the second electrophoretic particles are disposed between the first electrode and the second electrode, and the absolute value of the charge quantity of the first electrophoretic particles is larger than the absolute value of the charge quantity of the second electrophoretic particles. Therefore, by controlling the magnitude of the electric field between the first electrode and the second electrode, the movement of the first electrophoretic particles and the movement of the second electrophoretic particles can be controlled separately. In this way, when the electrooptical device displays an image, gradation control with the first color can be performed easily compared to gradation control performed using one type of electrophoretic particles.

Second Application Example

It is preferable that the electrooptical device according to the above-referenced application example further includes third electrophoretic particles that are pigmented in a second color and charged in a second polarity.

In this configuration, the third electrophoretic particles that are pigmented in the second color and charged in the second polarity are further included. This makes it possible to display mixture of the first color and the second color using the first and second electrophoretic particles pigmented in the first color and the third electrophoretic particles pigmented in the second color by way of easy gradation control with the first color. Therefore, gradation control for color mixture can be made easy.

Third Application Example

It is preferable that the electrooptical device according to the above-referenced application example further includes fourth electrophoretic particles that are pigmented in the second color and charged in the second polarity, and an absolute value of a charge quantity of the third electrophoretic particles is larger than an absolute value of a charge quantity of the fourth electrophoretic particles.

In this configuration, the fourth electrophoretic particles that are pigmented in the second color and charged in the second polarity are further included, and the absolute value of the charge quantity of the third electrophoretic particles is larger than the absolute value of the charge quantity of the fourth electrophoretic particles. Therefore, by controlling the magnitude of the electric field between the first electrode and the second electrode, the movement of the third electrophoretic particles and the movement of the fourth electrophoretic particles can be controlled separately. In this way, when the electrooptical device displays an image, gradation control with the second color can be performed easily compared to gradation control performed using one type of electrophoretic particles. As a result, when the electrooptical device displays an image, gradation can be displayed in a more preferred manner.

Fourth Application Example

It is preferable that the electrooptical device according to the above-referenced application example further includes fifth electrophoretic particles that are pigmented in a third color and charged in the first polarity, and an absolute value of a charge quantity of the fifth electrophoretic particles is different from the absolute value of the charge quantity of the first electrophoretic particles and from the absolute value of the charge quantity of the second electrophoretic particles.

In this configuration, the fifth electrophoretic particles that are pigmented in the third color and charged in the first polarity are further included, and the absolute value of the charge quantity of the fifth electrophoretic particles is different from the absolute value of the charge quantity of the first electrophoretic particles and from the absolute value of the charge quantity of the second electrophoretic particles. In this way, when the electrooptical device displays an image, control of display of color mixture using the first, second, and third colors can be made easy.

Fifth Application Example

It is preferable that, in the electrooptical device according to the above-referenced application example, the first electrophoretic particles and the second electrophoretic particles have different reflectivities with respect to light.

In this configuration, the first electrophoretic particles and the second electrophoretic particles have different reflectivities with respect to light. In this way, when the electrooptical device displays an image, gradation control can be performed by controlling the migration of the first electrophoretic particles and the migration of the second electrophoretic particles in consideration of the difference between the reflectivities of the electrophoretic particles. Therefore, the range of control can be expanded.

Sixth Application Example

It is preferable that, in the electrooptical device according to the above-referenced application example, the third electrophoretic particles and the fourth electrophoretic particles have different reflectivities with respect to light.

In this configuration, the third electrophoretic particles and the fourth electrophoretic particles have different reflectivities with respect to light. In this way, when the electrooptical device displays an image, gradation control can be performed by controlling the migration of the third electrophoretic particles and the migration of the fourth electrophoretic particles in consideration of the difference between the reflectivities of the electrophoretic particles. Therefore, the range of control can be expanded.

Seventh Application Example

In the electrooptical device according to the above-referenced application example, the dispersion medium is pigmented.

In this configuration, the pigmented dispersion medium makes possible color mixture by combination of the colors in which the electrophoretic particles are pigmented and the color of the dispersion medium. As a result, the electrooptical device can display an image in a more preferred manner.

Eighth Application Example

An electronic device displays an image and includes the above-referenced electrooptical device.

In this configuration, the electronic device uses the above-referenced electrooptical device. This makes it possible to provide an electronic device that can display an image with more preferable gradation.

Ninth Application Example

A control method for an electrooptical device according to the present application example controls gradation of an image to be displayed by controlling a distance over which first electrophoretic particles migrate and a distance over which second electrophoretic particles migrate using the first electrophoretic particles and the second electrophoretic particles. Here, the first electrophoretic particles are pigmented in a first color and charged in a first polarity, while the second electrophoretic particles have a different reflectivity with respect to light, are pigmented in the first color, and are charged in the first polarity by a charge quantity that is different from a charge quantity of the first electrophoretic particles.

This method controls gradation of an image to be displayed by controlling the distance over which the first electrophoretic particles migrate and the distance over which the second electrophoretic particles migrate using the first electrophoretic particles and the second electrophoretic particles. Here, the first electrophoretic particles are pigmented in the first color and charged in the first polarity, while the second electrophoretic particles have a different reflectivity with respect to light, are pigmented in the first color, and are charged in the first polarity by a charge quantity that is different from a charge quantity of the first electrophoretic particles. In this way, when the electrooptical device displays an image, gradation control with the first color can be performed easily compared to gradation control performed using one type of electrophoretic particles.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes embodiments of the invention in detail with reference to the drawings. It should be noted that the embodiments described below are not intended to unreasonably limit the contents of the invention described in the attached claims. Furthermore, not all configurations described below are constituent elements indispensable for achieving the advantage of the invention. The drawings are referred to for the sake of convenience of explanation.

The following embodiments describe an electrophoretic display device adopting an active matrix driving method as one example of an electrooptical device according to the invention. However, the electrooptical device according to the invention is by no means limited to the electrophoretic display device adopting the active matrix driving method.

First Embodiment

Figure 1:
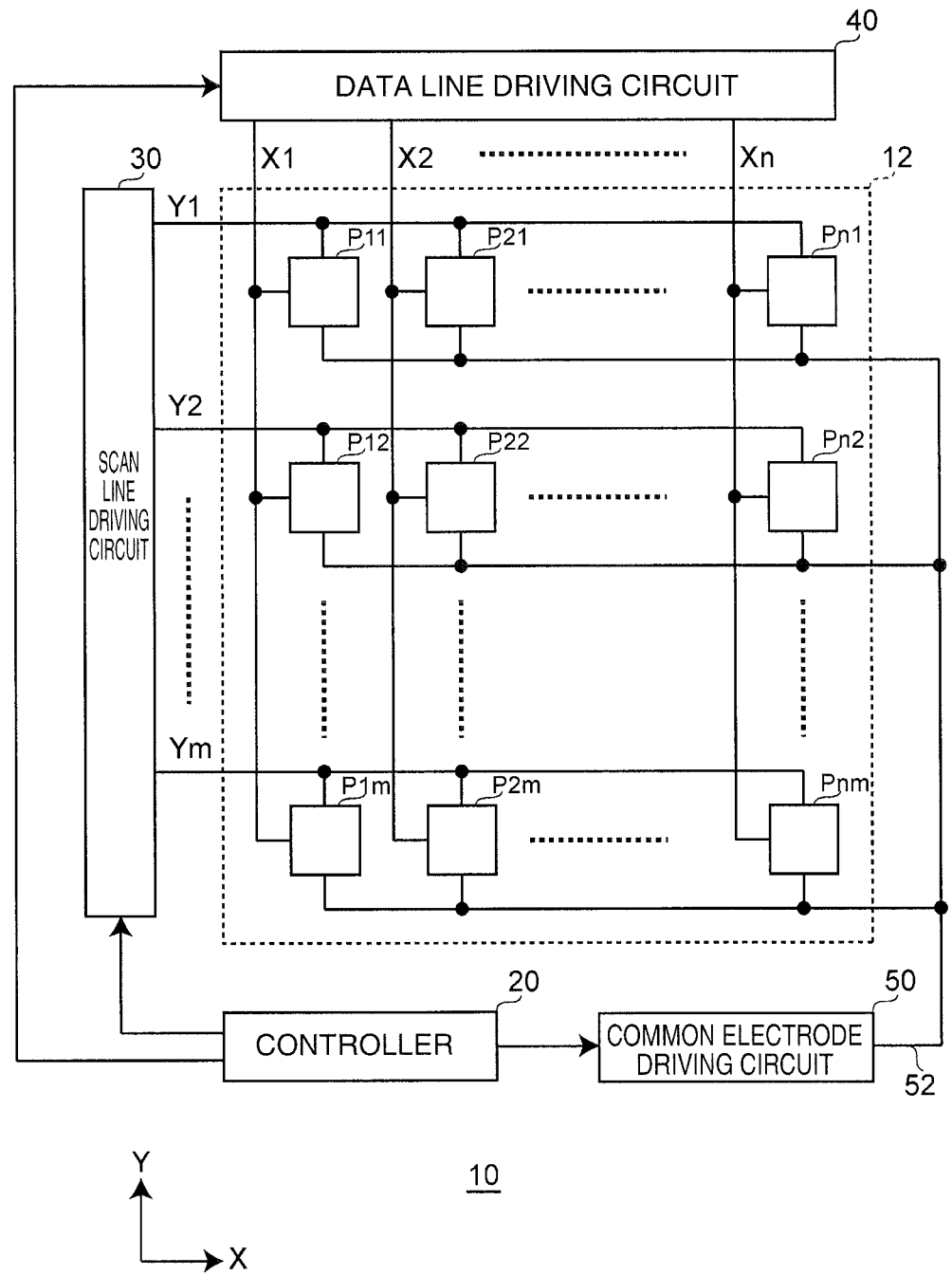
FIG. 1 is a block diagram showing an example of a configuration of an electrophoretic display device serving as an electrooptical device according to a first embodiment.

FIG. 1 is a general block diagram showing an electrophoretic display device 10 serving as an electrooptical device according to the present embodiment.

In the electrophoretic display device 10, pixels include display elements that have a function of a memory. The property of the electrophoretic display device 10 is such that, when a display state is not updated, a previous display state is retained.

The electrophoretic display device 10 includes a display region 12, a controller 20, a scan line driving circuit 30, a data line driving circuit 40, and a common electrode driving circuit 50.

The display region 12 includes a plurality of pixels P11 to Pn1, P12 to Pn2, . . . , P1m to Pnm arrayed in a matrix of m rows×n columns (m and n both being an integer equal to or greater than two). The plurality of pixels P11 to Pn1, P12 to P2, . . . , P1m to Pnm are configured in the same manner. In the display region 12, scan lines Y1 to Ym and data lines X1 to Xn are arranged such that the former and the latter intersect each other. More specifically, in the display region 12 are arranged m scan lines Y1 to Ym which extend in an X direction and line up in a Y direction, as well as n data lines X1 to Xn which extend in the Y direction and line up in the X direction. The pixels are arranged in one-to-one correspondence with intersections between the scan lines and the data lines. The pixels include their respective pixel electrodes, counter electrodes, and the like, and a configuration thereof will be described later.

The controller 20 controls the operations of the scan line driving circuit 30, the data line driving circuit 40, and the common electrode driving circuit 50. In order to realize a desired display state, the controller 20 supplies timing signals, such as clock signals and start pulse signals, to the scan line driving circuit 30, the data line driving circuit 40, and the common electrode driving circuit 50.

Under control of the controller 20, the scan line driving circuit 30 sequentially supplies scan signals, which are pulsed signals, to the scan lines Y1, Y2, . . . , Ym during a predetermined frame time period.

Under control of the controller 20, the data line driving circuit 40 supplies a data voltage to the data lines X1, X2, . . . Xn. For example, the data voltage is one of a reference voltage "GND" (e.g., 0 volts), a high-potential voltage "VSH" (e.g., +15 volts), and a low-potential voltage "−VSH" (e.g., −15 volts).

The common electrode driving circuit 50 supplies a common voltage Vcom (e.g., a voltage having the same electric potential as the reference voltage "GND") to a common electrode line 52 that is electrically connected to the counter electrodes of the pixels. The common voltage Vcom may be a voltage different from the reference voltage "GND" as long as the counter electrodes and the pixel electrodes at the time when the reference voltage "GND" has been supplied have substantially the same electric potential. For example, the common voltage Vcom may have a different value from the reference voltage "GND" supplied to the pixel electrodes in consideration of fluctuations in the electric potential of the pixel electrodes due to AC coupling with other signal lines, electrodes, and the like.

Figure 2:
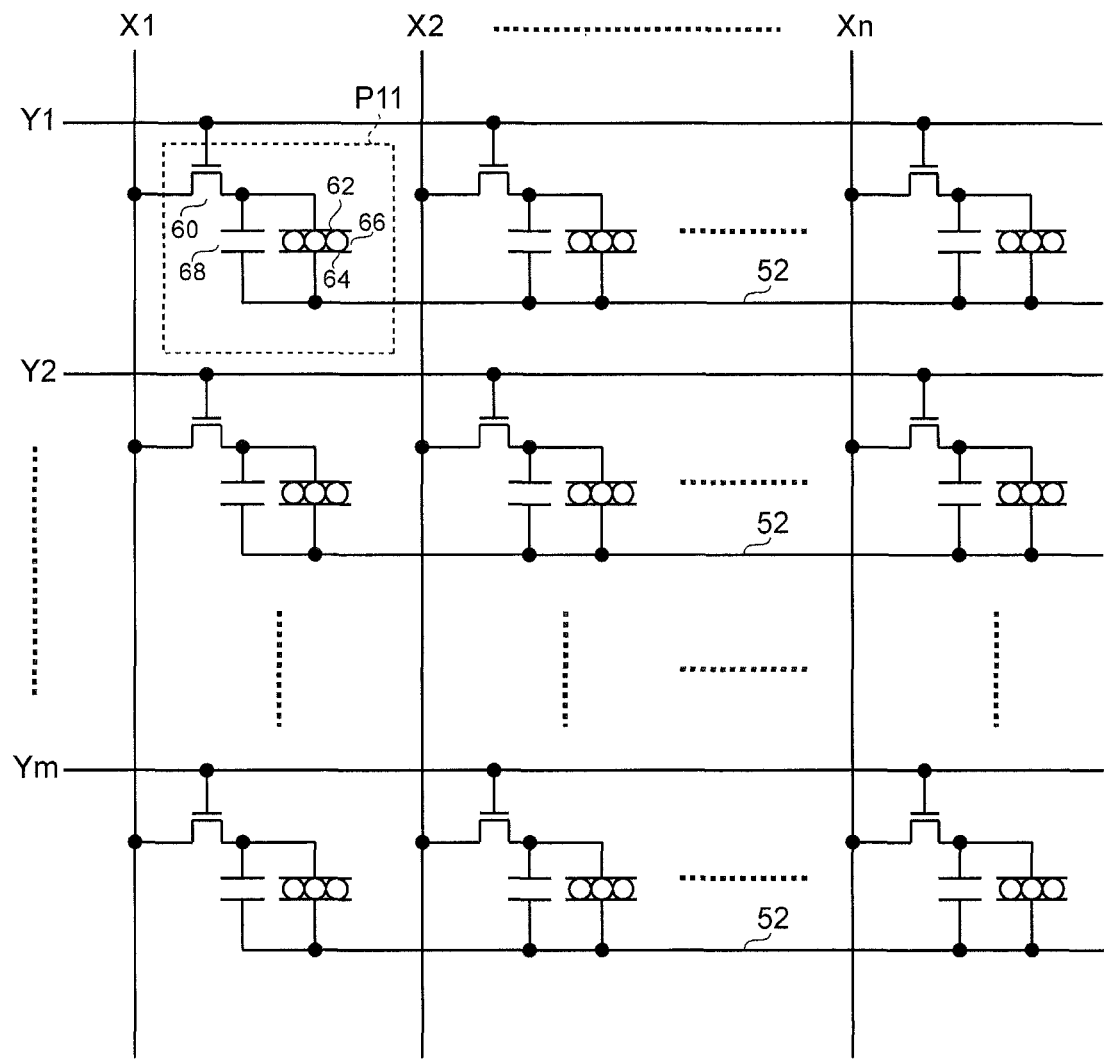
FIG. 2 shows an equivalent circuit representing a display region of the electrophoretic display device.

FIG. 2 shows an example of an equivalent circuit representing an electrical configuration of the display region 12. Components in FIG. 2 that are similar to those in FIG. 1 are given the same reference signs thereas, and a description thereof is omitted where appropriate. The pixels P11 to Pn1, P12 to Pn2, . . . , P1m to Pnm are configured in a similar manner. Therefore, the pixel P11 will be described below.

The pixel P11 includes a switching transistor 60, a pixel electrode 62, an counter electrode 64, electrophoretic elements (electrooptical elements) 66, and a holding capacitor 68.

The switching transistor 60 is constituted by, for example, an N-type metal-oxide-semiconductor (MOS) transistor. In the switching transistor 60, a gate is electrically connected to the scan line Y1, a source is electrically connected to the data line X1, and a drain is electrically connected to the pixel electrode 62 and one end of the holding capacitor 68. The switching transistor 60 outputs a data voltage supplied via the data line X1 to the pixel electrode 62 and one end of the holding capacitor 68 at a timing corresponding to a scan signal supplied via the scan line Y1.

The pixel electrode 62, which serves as a first electrode, is arranged so as to oppose the counter electrode 64 via the electrophoretic elements 66. The data voltage is supplied to the pixel electrode 62 via the data line X1 and the switching transistor 60.

The counter electrode 64, which serves as a second electrode, is electrically connected to the common electrode line 52 to which the common voltage Vcom is supplied. The counter electrodes included in the respective pixels P11 to Pn1, P12 to Pn2, . . . , P1m to Pnm have the same electric potential. The counter electrode 64 is formed from, for example, a transparent conductive material, such as magnesium-silver (MgAg), an indium tin oxide (ITO) film, and indium zinc oxide (IZO). An image is displayed on the side of the counter electrode 64.

The electrophoretic elements 66 are disposed between the pixel electrode 62 and the counter electrode 64 and form an electrophoretic layer. The electrophoretic elements 66 are composed of a plurality of microcapsules (broadly speaking, cells). Every microcapsule includes a plurality of electrophoretic particles that are charged and pigmented. That is to say, the electrophoretic display device 10 is a microcapsule-type electrophoretic display device.

The holding capacitor 68 includes a pair of electrodes that are arranged so as to oppose each other via a dielectric film. One electrode is electrically connected to the drain of the switching transistor 60 and the pixel electrode 62, while the other electrode is electrically connected to the common electrode line 52. The holding capacitor 68 can hold the data voltage supplied to the pixel electrode 62 for a predetermined time period.

Figure 3A:
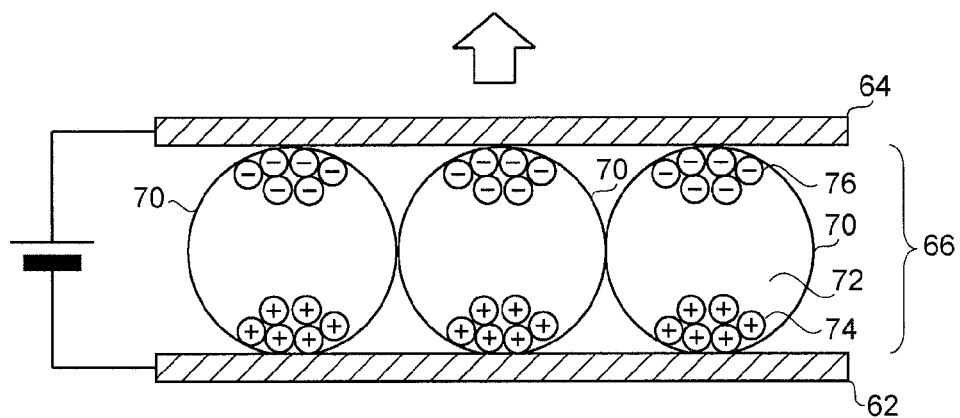
FIGS. 3A and 3B are explanatory diagrams showing the operations of the electrophoretic display device.
Figure 3B:
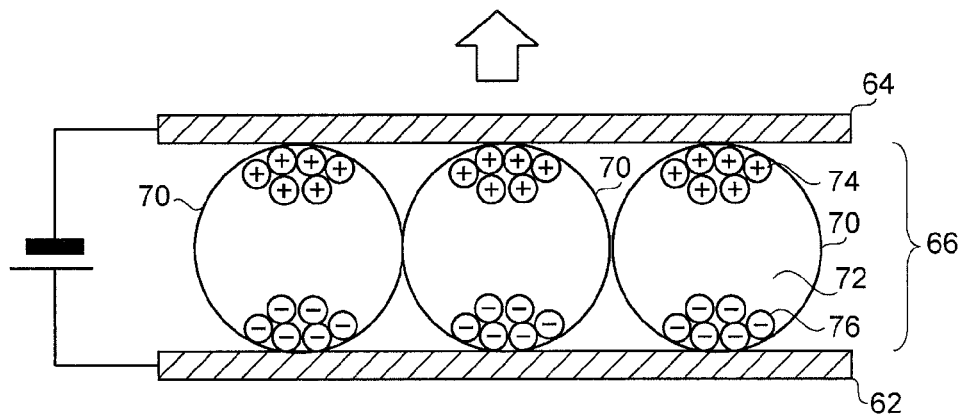

FIGS. 3A and 3B are explanatory diagrams showing the operations of the electrophoretic elements 66. FIGS. 3A and 3B schematically show partial cross sections of the counter electrode 64, the pixel electrode 62, and the electrophoretic elements 66 composing a pixel. Specifically, FIG. 3A shows the state where the counter electrode 64 is set at a higher electric potential than the pixel electrode 62, while FIG. 3B shows the state where the counter electrode 64 is set at a lower electric potential than the pixel electrode 62. Components in FIGS. 3A and 3B that are similar to those in FIG. 2 are given the same reference signs thereas, and a description thereof is omitted where appropriate.

Microcapsules 70 composing the electrophoretic elements 66 each include: a dispersion medium 72 that is, for example, viscous; electrophoretic particles 74 that are, for example, positively charged and pigmented in black; and electrophoretic particles 76 that are, for example, negatively charged and pigmented in white. The electrophoretic particles 74 and 76 are held between the pixel electrode 62 and the counter electrode 64, and migrate in the dispersion medium 72 in accordance with a voltage between these electrodes.

As shown in FIG. 3A, when the counter electrode 64 is set at a higher electric potential than the pixel electrode 62, the positively-charged black electrophoretic particles 74 are drawn toward the pixel electrode 62, whereas the negatively-charged white electrophoretic particles 76 are drawn toward the counter electrode 64. At this time, white is recognized when viewed from the side of the counter electrode 64.

On the other hand, as shown in FIG. 3B, when the counter electrode 64 is set at a lower electric potential than the pixel electrode 62, the positively-charged black electrophoretic particles 74 are drawn toward the counter electrode 64, whereas the negatively-charged white electrophoretic particles 76 are drawn toward the pixel electrode 62. At this time, black is recognized when viewed from the side of the counter electrode 64.

Meanwhile, when the counter electrode 64 is set at substantially the same electric potential as the pixel electrode 62, the electrophoretic particles 74 and 76 in the microcapsules 70 do not migrate electrophoretically, and a previous display state is retained.

Figure 4:
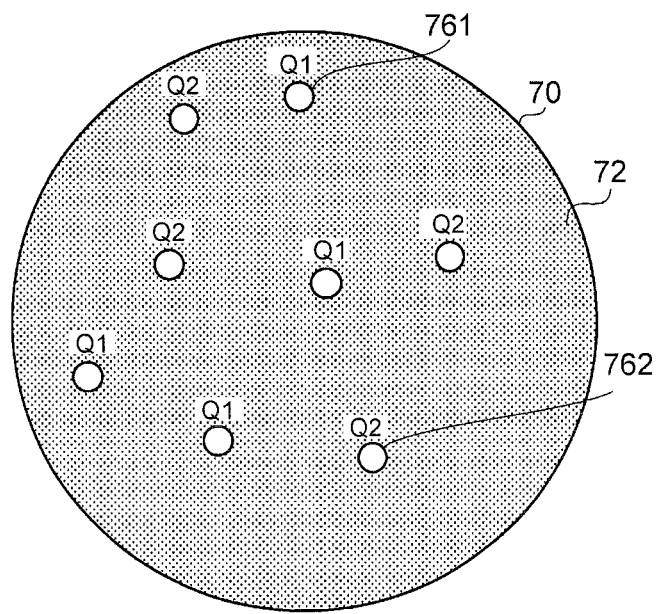
FIG. 4 schematically shows a microcapsule according to the first embodiment.

FIG. 4 schematically shows a configuration of a microcapsule 70 according to the present embodiment. Components in FIG. 4 that are similar to those in FIGS. 3A and 3B are given the same reference signs thereas, and a description thereof is omitted where appropriate.

The microcapsule 70 includes first electrophoretic particles 761, second electrophoretic particles 762, and a black dispersion medium 72. The first and second electrophoretic particles 761 and 762 are positively charged, white (first color), and have different charge quantities (quantities of electric charge that has been built up). The first electrophoretic particles 761 have a first charge quantity Q1, and the second electrophoretic particles 762 have a second charge quantity Q2 which is different from the first charge quantity Q1. Here, Q1>Q2.

Provided that the viscosity of the dispersion medium 72 is η, the particle diameter of electrophoretic particles is dp, the quantity of electric charge built up in electrophoretic particles is q, and the electric field applied to the electrophoretic elements 66 is E, the electrophoretic mobility (broadly speaking, mobility) μ denoting the migration velocity of electrophoretic particles per unit time is defined by the following equation.

Expression 1

$$\mu = \frac{q \cdot E}{3\pi \cdot \eta \cdot dp} \quad (1)$$

Figure 5:
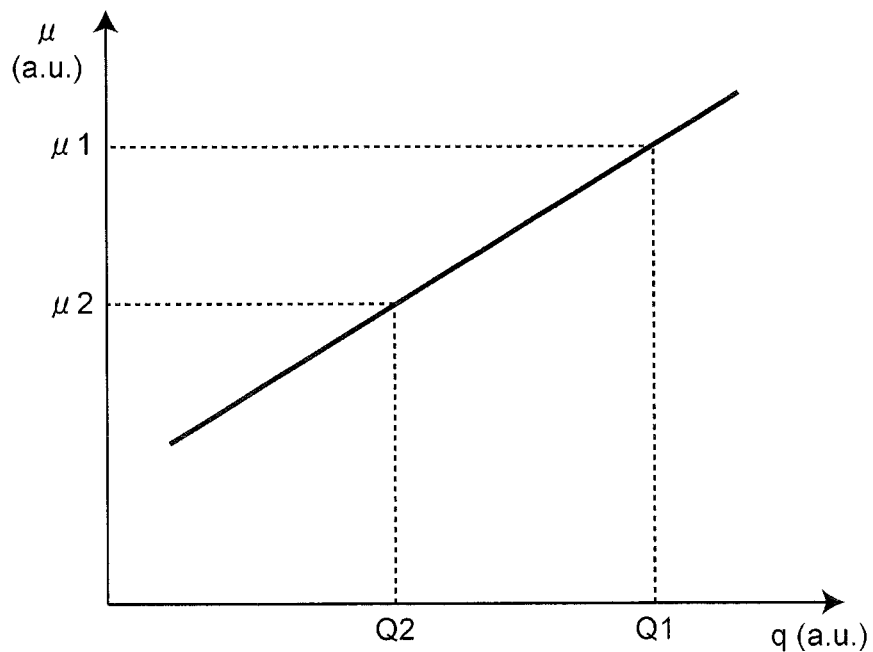
FIG. 5 is an explanatory diagram showing electrophoretic mobilities of electrophoretic particles according to the first embodiment.

As Q1>Q2, the mobility μ of the first electrophoretic particles 761 is larger than that of the second electrophoretic particles 762. FIG. 5 schematically shows the mobility μ1 of the first electrophoretic particles 761 and the mobility μ2 of the second electrophoretic particles 762. In FIG. 5, a horizontal axis represents the quantity of electric charge of electrophoretic particles in an arbitrary unit, while a vertical axis represents the electrophoretic mobility of electrophoretic particles in an arbitrary unit.

As can be seen from the equation (1), the mobility μ of electrophoretic particles can be changed by changing the quantity of electric charge q of electrophoretic particles. More specifically, as indicated by the equation (1), the larger the quantity of electric charge of electrophoretic particles, the larger the mobility of electrophoretic particles. As Q1>Q2, the electrophoretic mobility μ1 of the first electrophoretic particles 761 is larger than the electrophoretic mobility μ2 of the second electrophoretic particles 762.

That is to say, if the electric fields of the same magnitude are applied to the first and second electrophoretic particles 761 and 762 in such a manner that the first and second electrophoretic particles 761 and 762 can migrate, the first electrophoretic particles 761 migrate over a longer distance than the second electrophoretic particles 762 in a predetermined time period.

As a result, by using the difference between the electrophoretic mobilities of electrophoretic particles of the same color, it is possible to realize optical characteristics that are different from optical characteristics realized by electrophoretic particles of a single electrophoretic mobility.

Figure 6:
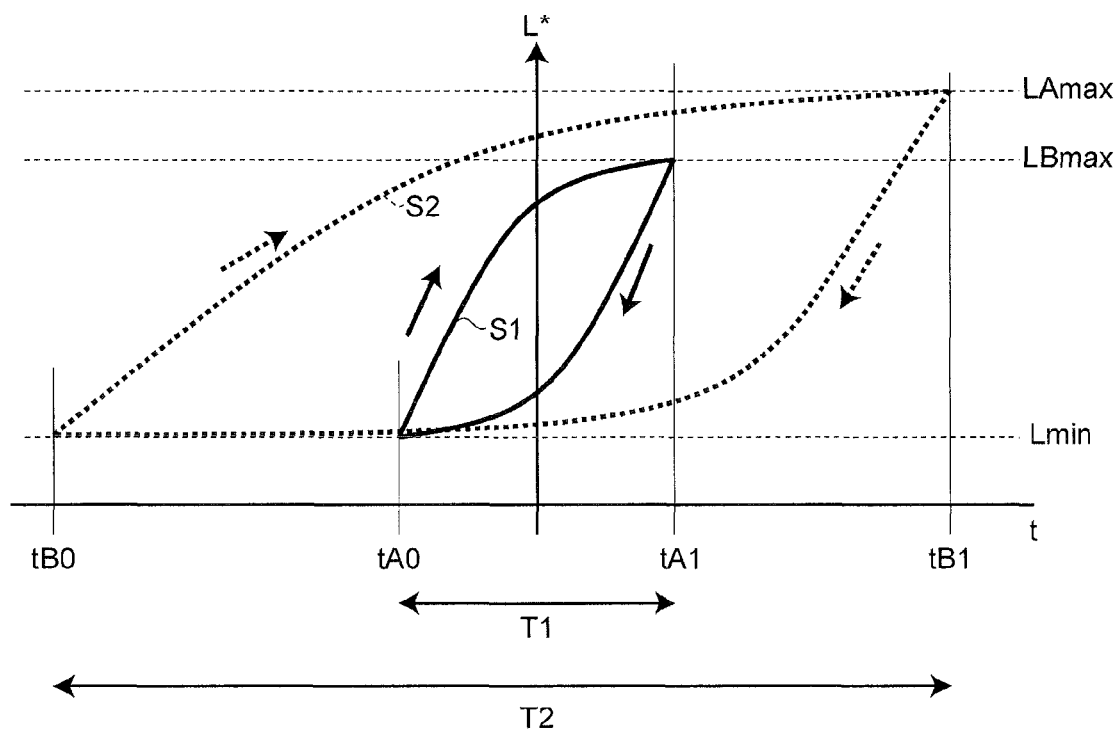
FIG. 6 shows an example of hysteresis characteristics of the light reflection of electrophoretic particles.

FIG. 6 shows light reflection characteristics attained when a predetermined electric charge is applied to the first and second electrophoretic particles 761 and 762 in the form of hysteresis characteristics. The characteristics of the first electrophoretic particles 761 are indicated as S1, while the characteristics of the second electrophoretic particles 762 are indicated as S2. In FIG. 6, a horizontal axis represents a temporal change, while a vertical axis represents lightness (L*).

Here, lightness (L*) denotes the amount of reflection of light on an image display surface at the time of application of a predetermined electric field in the case where the electrophoretic particles are mixed into a black dispersion medium. It should be noted that in FIG. 6, the optical reflectivity of the first electrophoretic particles 761 is lower than the optical reflectivity of the second electrophoretic particles. If the first and second electrophoretic particles 761 and 762 have the same optical reflectivity, the maximum value LBmax of the lightness (L*) of the first electrophoretic particles 761 is equal to the maximum value LAmax of the lightness (L*) of the second electrophoretic particles 762. On the other hand, the lightness (L*) of the first electrophoretic particles 761 and the lightness (L*) of the second electrophoretic particles 762 have the same minimum value Lmin regardless of the optical reflectivities thereof, as the color of the black dispersion medium is dominant.

As shown in FIG. 6, a time period required for the lightness (L*) of the first electrophoretic particles 761 to change from the maximum value LBmax to the minimum value Lmin, and a time period required for the same to change from the minimum value Lmin to the maximum value LBmax, are both T1. Similarly, a time period required for the lightness (L*) of the second electrophoretic particles 762 to change from the maximum value LAmax to the minimum value Lmin, and a time period required for the same to change from the minimum value Lmin to the maximum value LAmax, are both T2. Proper adjustment of the quantities Q1 and Q2 makes it possible to, for example, set T1 and T2 to 0.1 seconds and 0.5 seconds, respectively.

The magnitude of the light reflection by the electrophoretic elements 66 is equivalent to a combination of the lightness (L*) of the first electrophoretic particles 761 and the lightness (L*) of the second electrophoretic particles 762. By using the first electrophoretic particles 761 with a large mobility in fine adjustment of gradation as the magnitude of the light reflection, the gradation can be adjusted in a short time period. Furthermore, the way the gradation changes differs between the case where the reflectivity of the first electrophoretic particles 761 is lower than the reflectivity of the second electrophoretic particles 762, as shown in FIG. 6, and the case where the reflectivity of the first electrophoretic particles 761 is the same as the reflectivity of the second electrophoretic particles 762, even if the driving time period is the same in both cases. Therefore, by adjusting the amounts of the first and second electrophoretic particles 761 and 762 and by changing the reflectivities thereof, the characteristics of the electrophoretic elements 66 can be adjusted. This makes it possible to configure the electrophoretic display device 10 in accordance with the purpose of use.

Figure 7:
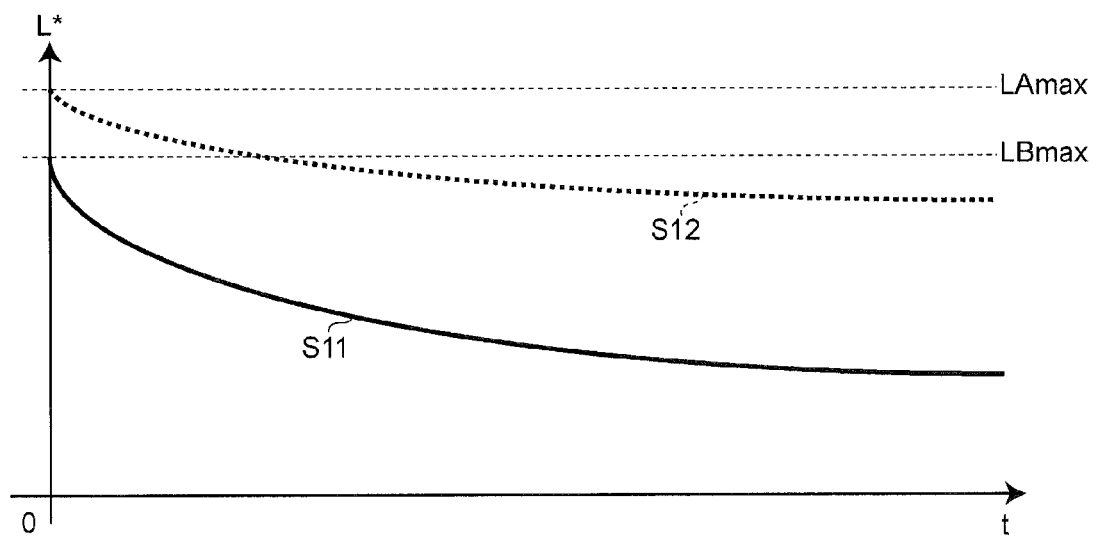
FIG. 7 shows examples of characteristics of electrophoretic particles regarding retainment of a display state.

FIG. 7 shows examples of characteristics of the first and second electrophoretic particles 761 and 762 regarding retainment of a display state. In FIG. 7, a horizontal axis represents a retained time period, a vertical axis represents lightness (L*), a solid line S11 represents retainment characteristics of the first electrophoretic particles 761, and a dotted line S12 represents retainment characteristics of the second electrophoretic particles 762.

The examples of FIG. 7 indicate that the retention characteristics of electrophoretic particles with a large mobility for an image tends to be not better than the retention characteristics of electrophoretic particles with a small mobility. In this case, it is preferable to use particles with a small mobility if a display state of a predetermined image is intended to be retained for a long time period as the electrooptical device.

Here, for example, if the first electrophoretic particles 761 and the second electrophoretic particles 762 are mixed at 70% and 30%, respectively, the following characteristics can be achieved: a time period for which the display state is retained is 200 days, and a time period required for gradation control is 0.2 seconds. In this way, a time period required for controlling gradation of a displayed image and a time period for which the image is retained can be balanced with each other in accordance with the purpose. In other words, the present embodiment can realize extension in a retained time period and reduction in a time period for image update, which cannot be realized merely with the use of electrophoretic particles of a single electrophoretic mobility.

Furthermore, for example, it will be assumed that a temperature range of operation of the first electrophoretic particles 761 is −20 degrees to 40 degrees, and a temperature range of operation of the second electrophoretic particles 762 is 0 degrees to 60 degrees. In this case, mixing the first and second electrophoretic particles 761 and 762 at predetermined amounts makes it possible to, for example, suppress the reduction in contrast to the minimum and expand a temperature range of operation to −20 degrees to 60 degrees.

The same goes for the case where the first electrophoretic particles 761 differ from the second electrophoretic particles 762 not only in the aforementioned characteristics but also in other characteristics. Mixing the first and second electrophoretic particles 761 and 762 makes it possible to realize characteristics that cannot be realized when white electrophoretic particles have only one type of electrophoretic mobility.

Second Embodiment

Figure 8:
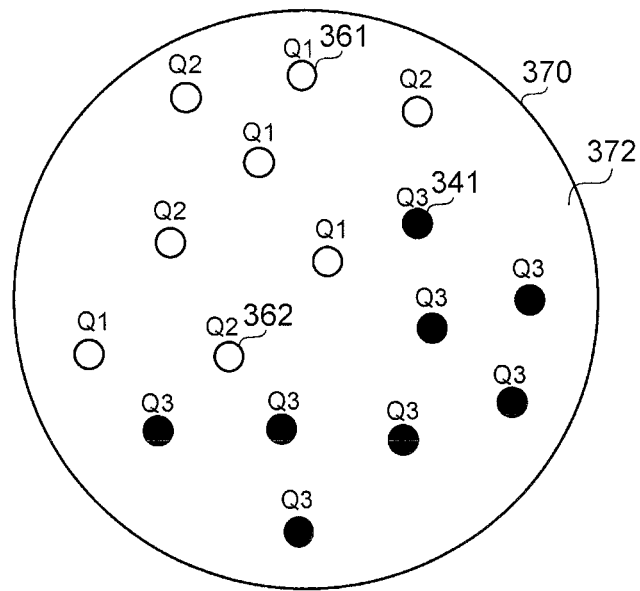
FIG. 8 schematically shows a general configuration of a microcapsule according to a second embodiment.

The present embodiment is an example that uses two types of electrophoretic particles that are charged in a first polarity and pigmented in white, as well as electrophoretic particles that are charged in a second polarity and pigmented in black. FIG. 8 schematically shows a microcapsule 370 used for the electrophoretic elements 66 according to the present embodiment. It should be noted that in the following embodiments, including the present embodiment, components that have functions similar to functions of components of the first embodiment are given the same reference signs thereas, and a description thereof may be omitted.

Figure 9:
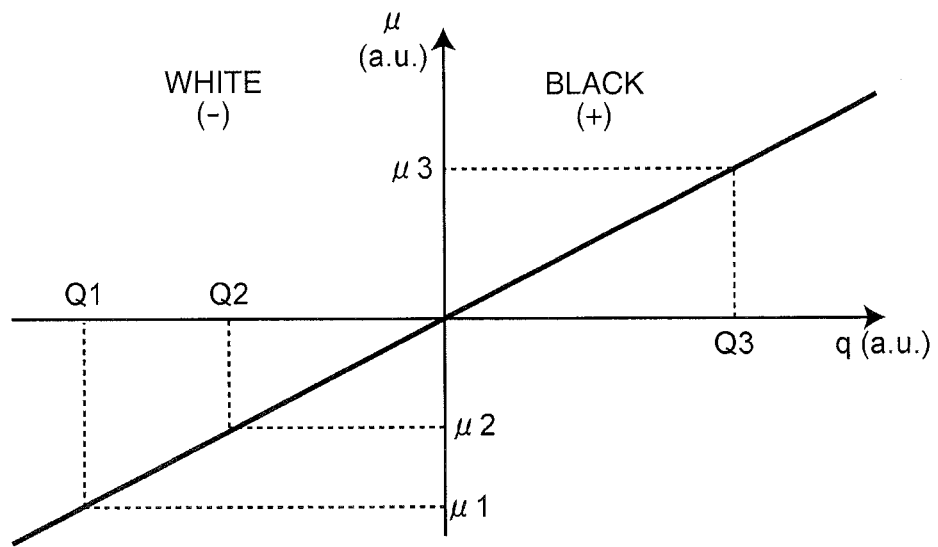
FIG. 9 is an explanatory diagram showing electrophoretic mobilities of electrophoretic particles according to the second embodiment.

The microcapsule 370 includes first electrophoretic particles 361 and second electrophoretic particles 362 pigmented in white, and third electrophoretic particles 341 pigmented in black. A dispersion medium 372 included in the microcapsule 370 is substantially transparent. In the present embodiment, the first electrophoretic particles 361 and the second electrophoretic particles 362 are negatively charged, the quantity of electric charge of the first electrophoretic particles 361 and the quantity of electric charge of the second electrophoretic particles 362 are Q1 and Q2, respectively, and the relationship Q1<Q2 is satisfied. The third electrophoretic particles 341 are positively charged, and the quantity of electric charge thereof is Q3. Therefore, if a predetermined electric field is applied to the electrophoretic elements 66, the first and second electrophoretic particles 361, 362 migrate in a direction opposite from a direction in which the third electrophoretic particles 341 migrate. FIG. 9 shows a relationship between a mobility and electric charge that has been built up. In FIG. 9, the mobilities of negatively-charged electrophoretic particles have negative values.

If a predetermined electric field is applied between the pixel electrode 62 and the counter electrode 64, the first and second electrophoretic particles 361 and 362 migrate in a direction opposite from a direction in which the third electrophoretic particles 341 migrate. In this way, gradation of an image displayed by the electrophoretic display device 10 is roughly controlled. Thereafter, by controlling the migration of the first electrophoretic particles 361 that have a mobility of a large absolute value, it is possible to control image display for fine gradation control.

Third Embodiment

Figure 10:
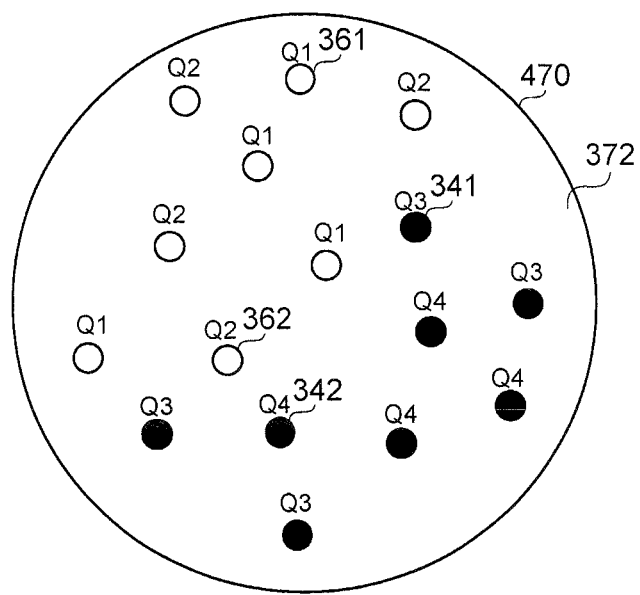
FIG. 10 schematically shows a general configuration of a microcapsule according to a third embodiment.
Figure 11:
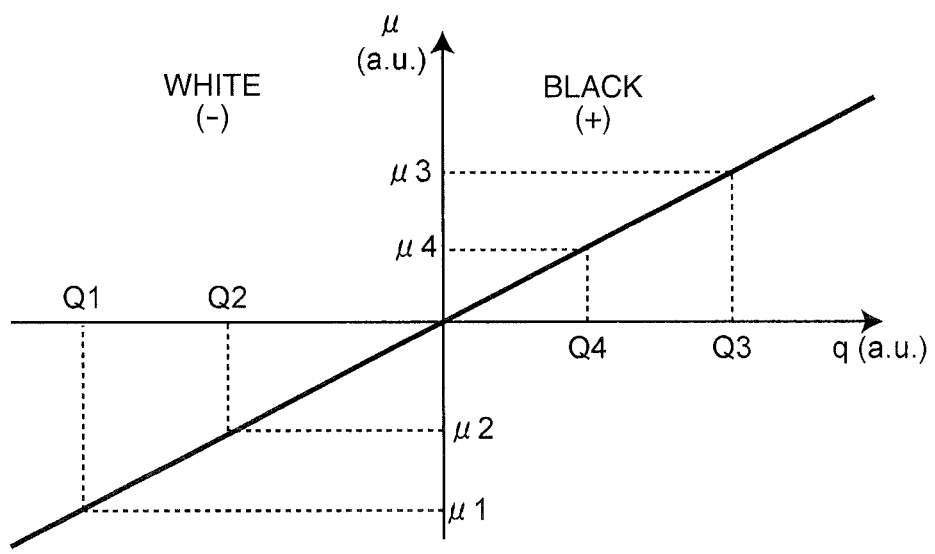
FIG. 11 is an explanatory diagram showing electrophoretic mobilities of electrophoretic particles according to the third embodiment.

The present embodiment is achieved by adding fourth electrophoretic particles 342 that are pigmented in black and have a positive electric charge Q4 to the second embodiment. It is assumed that the relationship Q3>Q4 is satisfied. FIG. 10 shows a microcapsule 470 according to the present embodiment, and FIG. 11 shows a relationship between a mobility and electric charge that has been built up.

If a predetermined electric field is applied between the pixel electrode 62 and the counter electrode 64, the first and second electrophoretic particles 361 and 362 migrate in a direction opposite from a direction in which the third and fourth electrophoretic particles 341 and 342 migrate. In this way, gradation of an image displayed by the electrophoretic display device 10 is roughly controlled. Thereafter, by controlling the migration of the first and third electrophoretic particles 361 and 341 that have a mobility of a large absolute value, it is possible to control image display for fine gradation control.

Fourth Embodiment

Figure 12:
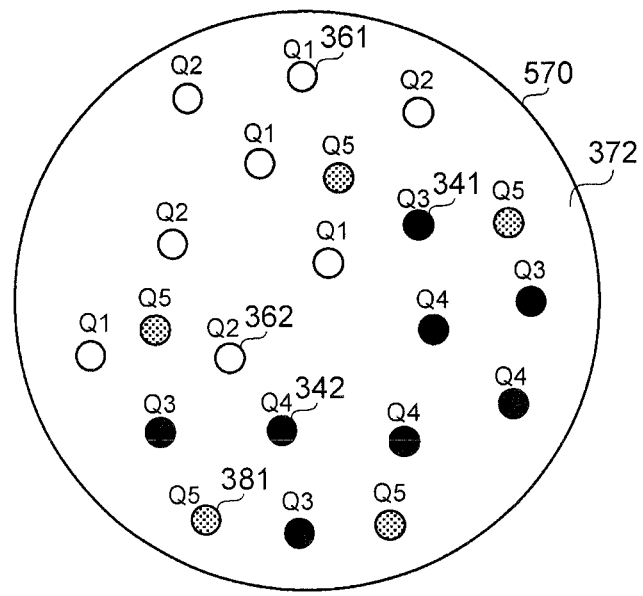
FIG. 12 is an explanatory diagram showing the operations for the case where black is to be displayed in a fourth embodiment.
Figure 13:
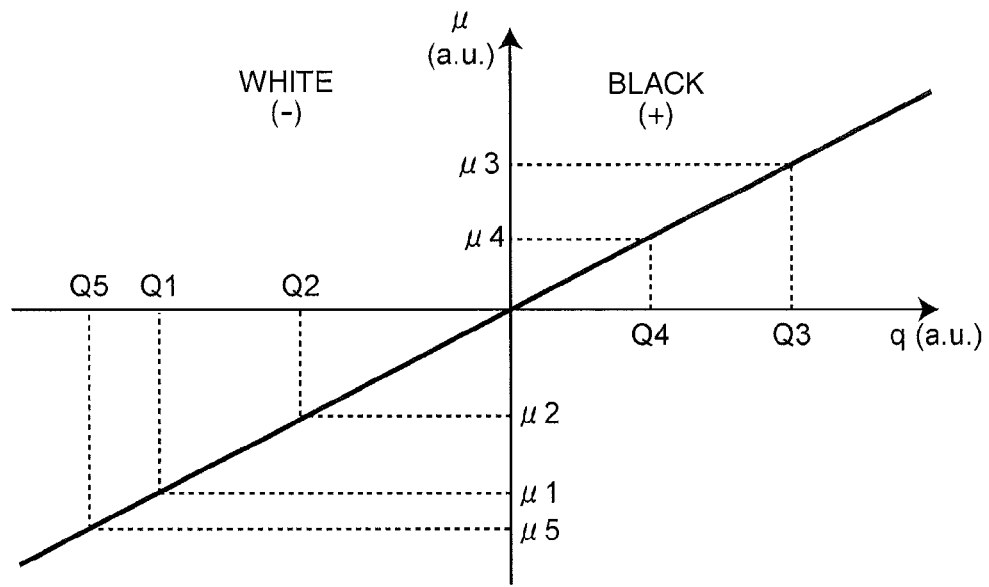
FIG. 13 is an explanatory diagram showing electrophoretic mobilities of electrophoretic particles according to the fourth embodiment.

The present embodiment is achieved by adding fifth electrophoretic particles 381 that are pigmented in red and have a negative electric charge Q5 to the third embodiment. It is assumed that the relationship Q5<Q1 is satisfied. FIG. 12 shows a microcapsule 570 according to the present embodiment, and FIG. 13 shows a relationship between a mobility and electric charge that has been built up.

If a predetermined electric field is applied between the pixel electrode 62 and the counter electrode 64, the first, second, and fifth electrophoretic particles 361, 362, and 381 migrate in a direction opposite from a direction in which the third and fourth electrophoretic particles 341 and 342 migrate. In this way, gradation of an image displayed by the electrophoretic display device 10 is roughly controlled. Thereafter, by controlling the migration of the first and third electrophoretic particles 361 and 341 that have a mobility of a large absolute value, and by further controlling the migration of the fifth electrophoretic particles 381 that have a mobility of a large absolute value, it is possible to control image display for fine gradation control. While the relationship Q5 <Q1 is satisfied in the present embodiment, a relationship between quantities of electric charge that has been built up is not limited to the one according to the present embodiment. For any relationship between quantities of electric charge, corresponding control can be set in accordance with reproduction of tone and gradation.

Fifth Embodiment

The present embodiment is an example achieved by pigmenting the first and second electrophoretic particles 361 and 362 in red and the fifth electrophoretic particles in white in the fourth embodiment.

If a predetermined electric field is applied between the pixel electrode 62 and the counter electrode 64, the first, second, and fifth electrophoretic particles 361, 362, and 381 migrate in a direction opposite from a direction in which the third and fourth electrophoretic particles 341 and 342 migrate. In this way, gradation of an image displayed by the electrophoretic display device 10 is roughly controlled. Thereafter, by controlling the migration of the first and third electrophoretic particles 361 and 341 that have a mobility of a large absolute value, and by further controlling the migration of the fifth electrophoretic particles 381 that have a mobility of a large absolute value, it is possible to control image display for fine gradation control.

Sixth Embodiment

The present embodiment is an example in which the electrooptical devices according to the first to fifth embodiments are applied to an electronic device.

Figure 14:
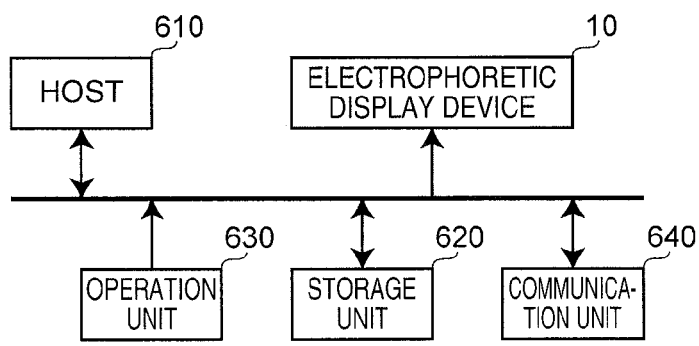
FIG. 14 is a block diagram showing an example of a configuration of an electronic device including an electrophoretic display device according to one of the first to fifth embodiments.

FIG. 14 is a block diagram showing an example of a configuration of an electronic device including an electrophoretic display device according to one of the first to fifth embodiments. An electronic device 600 includes a host 610, an electrophoretic display device 10, a storage unit 620, an operation unit 630, and a communication unit 640.

The host 610 controls the operations of components of the electronic device 600, including the electrophoretic display device 10. More specifically, the host 610 controls the operations of the electrophoretic display device 10 by executing a program prestored in the storage unit 620 and the like. The storage unit 620 stores the program and data executed by the host 610, as well as image data corresponding to images displayed by the electrophoretic display device 10. This function of the storage unit 320 is realized by a read-only memory (ROM), a random-access memory (RAM), and the like. The operation unit 630 is used by a user to input various types of information, and realized by various types of buttons, a keyboard, and the like. The communication unit 640 executes processing for external communication, and receives, for example, image data corresponding to images displayed by the electrophoretic display device 10.

Various types of devices may be used as the electronic device 600, including an electronic card (a credit card, a loyalty card, and the like), an electronic paper, an electronic notebook, an electronic dictionary, a remote control, a timepiece, a mobile telephone, a personal digital assistant such as an electronic book reader, and a calculator.

The above has described an electrooptical device, an electronic device, and the like according to the invention based on one of the embodiments. However, the invention is not limited to one of the embodiments. For example, the invention can be implemented in various aspects without departing from the concept thereof, and the following modifications are possible.

The invention is not limited to adopting the colors in which electrophoretic particles are pigmented, the polarities of the electric charge, the number of types of electrophoretic particles in a microcapsule, and the like described in the embodiments. Furthermore, the invention is not limited to adopting the materials of the electrodes, dispersion medium, and electrophoretic particles described in the embodiments.

The embodiments have described the examples in which electrophoretic particles with different electrophoretic mobilities are independently controlled in accordance with a time period of voltage application between the pixel electrode and the counter electrode. Alternatively, electrophoretic particles with different electrophoretic mobilities may be independently controlled in accordance with a level of applied voltage.

While the embodiments have described the invention as an electrooptical device, an electronic device, a control method for an electrooptical device, and the like, the invention is not limited in this way. For example, the invention may be an electrophoretic display device, an electrooptical device, or a driving method for an electrophoretic display device.

What is claimed is:

1. An electrooptical device that uses electrophoretic particles migrating in a dispersion medium for image display, comprising:
    a first electrode;
    a second electrode;
    first electrophoretic particles that are pigmented in a first color and charged in a first polarity; and
    second electrophoretic particles that are pigmented in the first color and charged in the first polarity, wherein
    the first electrophoretic particles and the second electrophoretic particles are disposed between the first electrode and the second electrode, and
    an absolute value of a charge quantity of the first electrophoretic particles is larger than an absolute value of a charge quantity of the second electrophoretic particles.

2. The electrooptical device according to claim 1, further comprising
    third electrophoretic particles that are pigmented in a second color and charged in a second polarity.

3. The electrooptical device according to claim 2, further comprising
    fourth electrophoretic particles that are pigmented in the second color and charged in the second polarity, wherein
    an absolute value of a charge quantity of the third electrophoretic particles is larger than an absolute value of a charge quantity of the fourth electrophoretic particles.

4. The electrooptical device according to claim 1, further comprising
    fifth electrophoretic particles that are pigmented in a third color and charged in the first polarity, wherein
    an absolute value of a charge quantity of the fifth electrophoretic particles is different from the absolute value of the charge quantity of the first electrophoretic particles and from the absolute value of the charge quantity of the second electrophoretic particles.

5. The electrooptical device according to claim 1, wherein the first electrophoretic particles and the second electrophoretic particles have different reflectivities with respect to light.

6. The electrooptical device according to claim 3, wherein the third electrophoretic particles and the fourth electrophoretic particles have different reflectivities with respect to light.

7. The electrooptical device according to claim 1, wherein the dispersion medium is pigmented.

8. An electronic device that displays an image, comprising the electrooptical device according to claim 1.

9. An electronic device that displays an image, comprising the electrooptical device according to claim 2.

10. An electronic device that displays an image, comprising the electrooptical device according to claim 3.

11. An electronic device that displays an image, comprising the electrooptical device according to claim 4.

12. An electronic device that displays an image, comprising the electrooptical device according to claim 5.

13. An electronic device that displays an image, comprising the electrooptical device according to claim 6.

14. An electronic device that displays an image, comprising the electrooptical device according to claim 7.

15. A control method for an electrooptical device, comprising
    controlling gradation of an image to be displayed by controlling a distance over which first electrophoretic particles migrate and a distance over which second electrophoretic particles migrate using the first electrophoretic particles and the second electrophoretic particles, the first electrophoretic particles being pigmented in a first color and charged in a first polarity, and the second electrophoretic particles having a different reflectivity with respect to light, being pigmented in the first color, and being charged in the first polarity by a charge quantity that is different from a charge quantity of the first electrophoretic particles.

* * * * *